United States Patent Office 3,472,899
Patented Oct. 14, 1969

3,472,899
PROCESS FOR PREPARING AMINOALKYLETHERS WHEREIN THE AMINO GROUP IS ATTACHED TO A TERTIARY CARBON ATOM
Philip E. Brumfield, Elkhart, Ind., assignor to Commercial Solvents Corporation, New York, N.Y., a corporation of Maryland
No Drawing. Filed Oct. 13, 1965, Ser. No. 495,681
Int. Cl. C07c 93/04; A01n 9/20
U.S. Cl. 260—584                2 Claims

ABSTRACT OF THE DISCLOSURE

Nitroalkylethers and aminoalkylethers of the formula

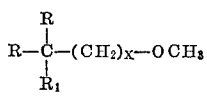

wherein R is methyl, ethyl or propyl, $R^1$ is $NH_2$ or $NO_2$ and X is an integer ranging from 1 to 3. The nitroalkylethers are useful as insecticides. The aminoalkylethers are useful as emulsifiers for waxes. An example of the nitroalkylethers is 1-methoxy-2-nitro-2-ethyl-1-propane. An example of the aminoalkylethers is 1-methoxy-2-ethyl-2-propylamine. A process for preparing nitroalkylethers which consists of reacting a nitro alcohol of the formula

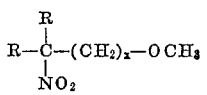

with methyl sulfate. The reaction is carried out under etherification conditions. A process for preparing aminoalkylethers which consists of reducing a nitroalkylether of the formula

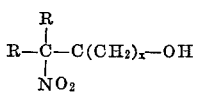

---

This invention relates to novel compositions of matter. In a particular aspect it relates to novel nitro- and aminoalkylethers and to processes for preparing same.

An object of the present invention is the provision of novel compositions of matter of the formula.

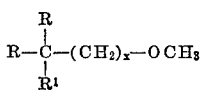

wherein R is methyl, ethyl or propyl, wherein $R^1$ is $NH_2$ or $NO_2$ and wherein X is an integer ranging from 1 to 3. Included among the novel compositions of matter of the present invention are 1-methoxy-2-nitro-2-methylpropane, 1-methoxy-2-methyl-2-propylamine, 1-methoxy-2-nitro - 2-ethylpropane, 1-methoxy-2-ethyl-2-propylamine, 1-methoxy-3-nitro-3-methylpentane, 1-methoxy-3-methyl-3-pentylamine, 1-methoxy-2-nitro-2-propylbutane, 1-methoxy - 2-propyl-2-butylamine, 1-methoxy-3-nitro-3-methylhexane, 1-methoxy-3-methyl-3-hexylamine, and the like.

A further object of the present invention is the provision of a process for preparing novel nitroalkylethers of the formula

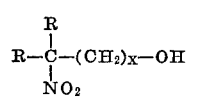

wherein R and X have the values assigned to them above.

A still further object of the present invention is the provision of a process for preparing novel aminoalkylethers of the formula

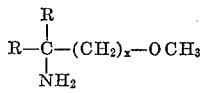

wherein R and X have the values assigned to them above.

Additional objects and advantages of the present invention will be obvious from the specification and the appended claims.

The novel nitroalkylethers of the present invention are prepared by the reaction of methyl sulfate with a nitroalcohol of the formula

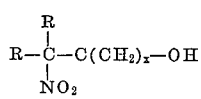

wherein R and X have the values assigned to them above.

Examples of suitable nitroalcohols include 2-nitro-2-methyl-1-propanol, 2-nitro-2-ethyl-1-propanol, 3-nitro-3-methyl-1-pentanol, 2-nitro-2-propyl-1-butanol, 3-nitro-3-methyl-1-hexanol, and the like.

The reaction is typically conducted under etherification conditions at temperatures in the range of from about 25 to about 150° C. Temperatures below about 25° C. are generally not practical because of the slow rate of the reaction, while temperatures above 150° C. tend to cause substantial decomposition of the reactants and reaction products. While a broad range of temperatures in the range of from about 50 to about 125 C. is generally suitable, it is prefered to use temperatures in the range from about 80 to about 100° C.

The molecular proportions used in producing the novel nitroalkylethers of the present invention can vary over a wide range. Typically mole ratios of nitroalcohol to methyl sulfate of 5:1 to 1:5 may be satisfactorily employed with mole ratios of approximately 1:1 being preferred.

In carrying out the reaction of the present invention it is preferable to employ an inert solvent for the reactants, that is a solvent inert to the reactants and the reaction products. Examples of such solvents which are useful in the present invention include benzene, toluene, xylene, dioxane, methyl iodide, cyclohexane, and the like. The reaction is conducted in the presence of an amount of an alkaline reagent sufficient to neutralize any acid produced in the reaction. Suitable alkaline reagents include sodium carbonate, potassium carbonate, sodium hydroxide, potassium hydroxide, and the like. After completion of the reaction the nitroalkylether can be purified by any suitable means, such as distillation.

The novel nitroalkylethers of the present invention can be reduced to the corresponding amines by any suitable reduction procedure. Thus the invention provides a novel means for obtaining the aminoalkylethers of the present invention.

In carrying out the reduction step the nitroalkylether is dissolved in a suitable solvent such as methanol or ethanol and then reduced under hydrogenation conditions, for instance at temperatures in the range of from about 25 to about 100° C. and at pressures in the range of from about 400 to about 1000 p.s.i. in the presence of catalytic amounts of a suitable hydrogenation catalyst such as Raney nickel. After reduction has taken place the aminoalkylether can then be purified by any suitable means such as by distillation.

The novel nitroalkylethers of the present invention are useful as insecticides and as intermediates in the preparation of the novel aminoalkylethers of the present invention. The novel aminoalkylethers of the present invention are useful as emulsifying agents for waxes.

The invention will be understood more fully by reference to the following examples. It is understood that the examples are presented for purposes of illustration only and are not intended as a limitation of the invention.

EXAMPLE 1

To a reactor containing a mixture of 298 grams of 2-nitro-2-methyl-1-propanol, 400 milliliters of benzene, and 160 grams of sodium carbonate, the said mixture having a temperature of about 86° C., were added 250 milliliters of methyl sulfate over a period of about 2 hours. The temperature of the reaction mixture was maintained in the range of 86–95° C. during the 2-hour addition period. At the end of the addition period the reaction mixture was distilled to remove benzene. The distilled reaction mixture was then refluxed at 95–96° C. for approximately 12 hours and then permitted to cool to room temperature. The cooled reaction mixture was filtered, the filter cake was washed with 200 milliliters of benzene and the benzene was removed by distillation. 1-methoxy-2-nitro-2-methyl-1-propane was obtained.

EXAMPLE 2

100 grams of 1-methoxy-2-nitro-2-methylpropane obtained according to the process of Example 1 were added to 500 milliliters of methanol to form a slurry. To the slurry were then added 100 grams of Raney nickel. The resulting reaction mixture was then charged to a pressure vessel equipped with a heating jacket. The material was then hydrogenated at approximately 50° C. and at a pressure of approximately 500 p.s.i. The hydrogenation required a period of approximately 2 hours during which time the reaction mixture was constantly agitated. After absorption of hydrogen had ceased the reaction mixture was withdrawn from the reactor, the catalyst was removed by filtration, and the methanol separated from the reaction mixture by fractional distillation. 1-methoxy-2-methyl-2-propylamine was obtained.

EXAMPLE 3

This example is offered to demonstrate the effectiveness of 1-methoxy-2-methyl-2-propylamine as an emulsifier for carnauba wax in an aqueous medium.

100 grams of carnauba wax were heated to 95° C. to form a melt. To the molten wax were then added 21 grams of oleic acid with agitation. To the resulting mixture was then added a 10-gram portion of the 1-methoxy-2-methyl-2-propylamine of Example 2. The resulting mixture was thoroughly stirred to form a uniform mixture. This uniform mixture was then added to 840 milliliters of water with thorough stirring. The resulting product was a stable, aqueous emulsion of carnauba wax suitable for use as a self-polishing floor wax.

EXAMPLE 4

1-methoxy-3-nitro-3-methylpentane is prepared by essentially the same procedure used in Example 1 except that 3-nitro-3-methyl-1-pentanol is substituted for 2-nitro-2-methyl-1-propanol. The 1-methoxy-3-nitro-3-methylpentane can be reduced according to the procedure of Example 2 to obtain 1-methoxy-3-methyl-3-pentylamine.

EXAMPLE 5

1-methoxy-2-nitro-2-propylbutane is prepared by essentially the same procedure used in Example 1 except that 2-nitro-2-propyl-1-butanol is substituted for 2-nitro-2-methyl-1-propanol. The 1-methoxy-2-nitro-2-propylbutane can be reduced according to the procedure of Example 2 to obtain 1-methoxy-2-propyl-2-butylamine.

EXAMPLE 6

1-methoxy-2-nitro-2-ethylpropane is prepared by essentially the same procedure used in Example 1 except that 2-nitro-2-ethyl-1-propanol is substituted for 2-nitro-2-methyl-1-propanol. The 1-methoxy-2-nitro-2-ethylpropane can be reduced according to the procedure of Example 2 to obtain 1-methoxy-2-ethyl-2-propylamine.

EXAMPLE 7

1-methoxy-3-nitro-3-methylhexane is prepared by essentially the same procedure used in Example 1 except that 3-nitro-3-methyl-1-hexanol is substituted for 2-nitro-2-methyl-1-propanol. The 1-methoxy-3-nitro-3-methylhexane can be reduced according to the procedure of Example 2 to obtain 1-methoxy-3-methyl-3-hexylamine.

I claim:

1. A process for the production of aminoalkylethers having the general formula $$R-\underset{\underset{NH_2}{|}}{\overset{\overset{R}{|}}{C}}-(CH_2)_x-OCH_3$$

wherein R is methyl, ethyl or propyl and wherein X is an integer ranging from 1 to 3 which comprises reducing a nitroalkylether of the formula $$R-\underset{\underset{NO_2}{|}}{\overset{\overset{R}{|}}{C}}-(CH_2)_x-OCH_3$$

wherein R is methyl, ethyl or propyl and wherein X is an integer ranging from 1 to 3, said reducing being conducted by hydrogenating said nitroalkylether at a temperature of about 25 to 100° C., a pressure of about 400 to 1000 p.s.i., and in the presence of a solvent and catalytic amounts of a metallic hydrogenation catalyst wherein the metal consists of nickel.

2. The process of claim 1 wherein the catalyst is Raney nickel and the solvent is selected from the group consisting of methanol and ethanol.

References Cited

UNITED STATES PATENTS 2,764,615   9/1956   Data et al.
3,253,039   5/1966   Rylander et al. ____ 260—583 X

OTHER REFERENCES

Harder et al., Chemische Berichte, vol. 97, No. 2 (February 1964), pp. 510–519 (pages 516 relied on).

CHARLES B. PARKER, Primary Examiner

R. L. RAYMOND, Assistant Examiner

U.S. Cl. X.R.

106—10; 260—614; 424—325